United States Patent [19]

Neace

[11] 3,792,492

[45] Feb. 12, 1974

[54] AIR BEARING MULTI-CHANNEL MAGNETIC HEAD ASSEMBLY

[76] Inventor: Samuel E. Neace, 95440 Henderson Ave., Sunnyvale, Calif. 94086

[22] Filed: Dec. 20, 1972

[21] Appl. No.: 316,903

Related U.S. Application Data

[62] Division of Ser. No. 126,565, March 22, 1971, Pat. No. 3,722,081.

[52] U.S. Cl. .............................. 360/103, 360/121

[51] Int. Cl. .......................... G11b 5/60, G11b 5/22

[58] Field of Search .............. 179/100.2 C, 100.2 P; 340/174.1 E

[56] References Cited

UNITED STATES PATENTS

| | | | |
|---|---|---|---|
| 3,678,482 | 7/1972 | Billawala | 179/100.2 P |
| 3,634,933 | 1/1972 | Hanak | 179/100.2 C |
| 2,711,945 | 6/1955 | Kornei | 179/100.2 C |
| 3,564,522 | 2/1971 | Stevens | 179/100.2 C |
| 3,353,261 | 11/1967 | Bradford et al. | 179/100.2 C |
| 3,303,292 | 2/1967 | Bedell | 179/100.2 C |

*Primary Examiner*—Bernard Konick
*Assistant Examiner*—Robert S. Tupper
*Attorney, Agent, or Firm*—Fraser and Bogucki

[57] ABSTRACT

A multi-channel magnetic head assembly for non-contact usage comprises a pair of essentially unitary structures joined along a common plane. A first of the structures comprises a plurality of pole tip elements, formed from a single element and affixed within individual slots to a slotted air bearing element. The individual pole tip elements bridge, at the common plane, individual core legs having a common base and joined to a small circuit board. The arrangement provides precise gap depth, virtually zero gap scatter, and an effective gap length that corresponds to the physical length. The head also minimizes change of head position, and is extremely small and of low mass.

Methods of making multi-channel, non-contact head assemblies in accordance with the invention are based upon readily automated cutting and finishing steps. A unitary pole tip assembly is formed from a pair of block elements with an interposed non-magnetic spacer. Interchannel grooves are cut across the gap, forming a comb-like structure which is inserted into and affixed to a slotted air bearing element. The base of the comb-like structure is then ground away to a selected reference plane. The multiple pairs of core legs are formed by grooving a unitary magnetic block in two directions and this base structure is then joined to the pole tip elements.

7 Claims, 10 Drawing Figures

AIR BEARING MULTI-CHANNEL MAGNETIC HEAD ASSEMBLY

This is a division of application Ser. No. 126,565, now U.S. Pat. No. 3,722,081, filed March 22, 1971.

BACKGROUND OF THE INVENTION

1. Field of the Invention

This invention relates to multi-channel magnetic head assemblies for non-contact applications, such as magnetic disk systems, and more particularly to extremely small multi-channel heads for air bearing applications and methods for making the same with advantageous mechanical and magnetic properties.

2. History of the Prior Art

An example of a multi-track magnetic recording head is provided in U. S. Pat. No. 3,562,442, issued to Charles B. Pear, Jr. and dated Feb. 9, 1971. In this construction, a unitary pole tip assembly is initially used, having grooves between the unitary pole tip pairs, which are then joined together by inserted magnetic spacers, after which the joining surfaces of the back side of the pole tip structure are removed and an assembly of U-shaped, individual core legs separated by magnetic spacers, is attached by bonding. The principal objectives of the Pear, Jr. application are directed toward contact recording, specifically the provision of hardened facing surfaces to contact a magnetic tape or other record member. Neither the construction or method is suitable for use in modern, non-contact multi-channel head assemblies used for disk and other extremely high density recording and reproduction systems. The assemblies are too large and bulky, and the manual and precision steps needed to form, insert and join the various elements are both time consuming and expensive.

Disk systems typically use flying head assemblies, in which multi-channel magnetic heads must be disposed flush with an air bearing surface, and should have a very precisely determined magnetic head gap depth, as well as low gap scatter variation. In addition, the individual channels are typically very closely spaced together, with only a single channel being used at a time so that non-magnetic spacers for holding the assembly together cannot be employed. It is further not desired to use such spacers because it is desired to have an extremely compact magnetic head unit that also has low mass for the flying head mechanism. Small sizes and masses are imperative because, unlike magnetic tape systems, the flying head assembly either forms a part of a high speed servo controlled mechanism such as a movable arm accessing system, or a significant number of head assemblies must be used, as in a head per track type of disk file system. Prior structures, such as shown in the Pear, Jr. patent, use a plurality of individual core leg structures, assembled together with windings around one or more legs, and with interposed spacers of non-magnetic material being used. It is highly desirable, for cost, weight and fabrication considerations, to avoid the tedious and difficult job of manual insertion and bonding of the spacer elements, and to fabricate the entire structure by steps that may be virtually automatically performed on standard grinding, lapping and cutting machines. While achieving these advantages, it is also desired to achieve the objectives of having virtually zero gap scatter, a precisely controlled gap depth, and pole tips at the non-magnetic gap that are precisely defined. There is a substantial change in the effective electrical dimension of a non-magnetic gap when the gap spacer permeates the pole tip material, as with the glass or other chemically bonded element, or the pole tip corners are irregular, as often happens with typical machining operations.

A number of specific requirements present conflicting factors that have not been satisfactorily overcome in the prior art. It is known, for example, to affix individual magnetic heads by the use of a synthetic adhesive to an air bearing pad. The preferred synthetic adhesives, however, such as epoxy, are generally hygroscopic in character, and change in dimension as they pick up moisture. Consequently a very troublesome problem of relative head shift has been encountered, in which the heads tend either to withdraw further from the air bearing surfaces or protrude outwardly. The former condition can lead to loss of data and the latter condition can lead to complete head failure and head crash. The provision of a head pad with associated multi-channel head assembly is not fully adequate for all problems involved, inasmuch as the problems involved in winding the core legs, and then coupling these to appropriate selection and data transfer circuitry can be severe. Typically, much of such work has been done manually and on a piecemeal basis, with the winding and wiring being completely manual. This not only greatly increases the cost but also results in a greater number of rejections. Such objectives are achieved by structures and methods in accordance with the present invention.

SUMMARY OF THE INVENTION

Multi-channel magnetic head assemblies in accordance with the invention comprise a unitary bonded structure in a slotted air bearing member, including a plurality of pole tips precisely positioned within and adjoined to the sides of the individual slots in the air bearing member. The pole tip elements are formed from a pair of magnetic block elements, with an interposed non-magnetic spacer, and at least one of the facing surfaces of the non-magnetic gap includes an interior inclined or tapered surface that precisely defines the gap depth. The interior portions of the pole tip elements terminate at a flat surface defining a common plane, to which are joined flat ends of individual pairs of core legs extending from a common and unitary base structure. The head structure further includes an integral small circuit board affixed to the base of the core structure and including circuit innerconnections and selection diodes for controlling both the selection of a given head and effecting data transfer with external units.

Methods in accordance with the present invention permit virtually continuous and automatic production of extremely small, but nevertheless precisely dimensioned magnetic head assemblies. A unitary comb-like pole tip structure is formed by joining two bar elements having flat opposing surfaces, one of which includes a longitudinal, gap depth defining, groove or notch, the two elements being separated by a thin non-magnetic spacer and joined together by a conductive alloy under heat and pressure. A comb-like structure is then formed by cutting interchannel grooves to below the gap depth, and the protruding portions of the comb-like structure are fitted into slots in a slotted air bearing element, and bonded to the air bearing element while in position. Thereafter, the base of the comb-like structure is removed to define a flat reference surface. A unitary base structure is formed by grinding interchannel grooves in a rectangular block and also cutting a transverse groove to define individual core leg pairs protruding from the common base. Windings may be added manually or mechanically to at least one of each pair of core legs. After affixation of the base structure to a circuit board and completion of circuit interconnections the base structure is affixed to the bridging pole tip pairs by joining at the ends of the core leg pairs.

BRIEF DESCRIPTION OF THE DRAWINGS

A better understanding of the invention may be had by reference to the following description, taken in conjunction with the accompanying drawings, in which.

DETAILED DESCRIPTION

Figure 1:
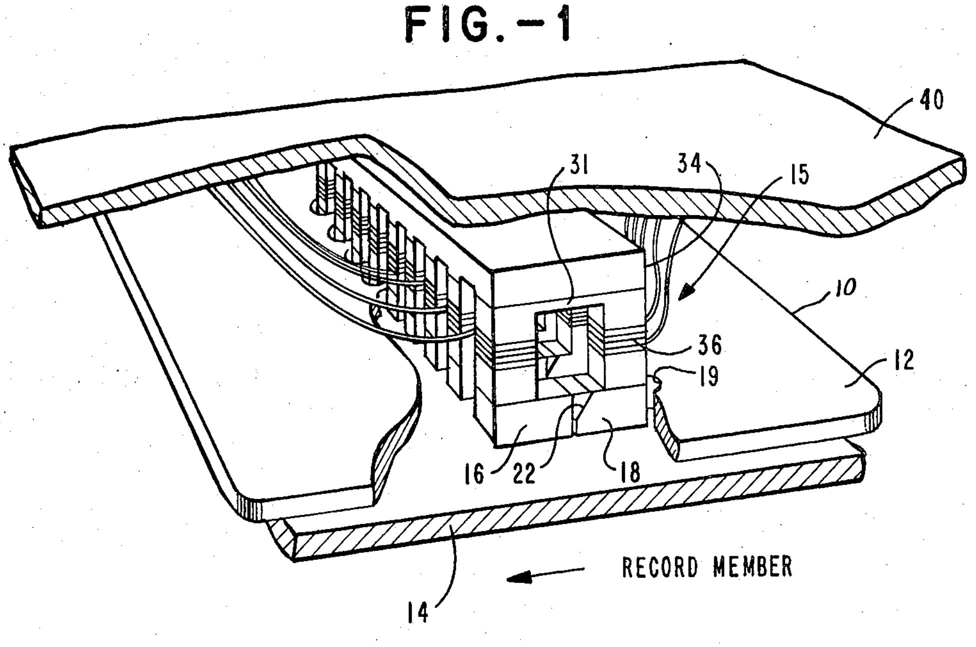
FIG. 1 is a perspective view, partially broken away, showing a multi-channel head assembly for non-contact recording in accordance with the invention.
Figure 2:
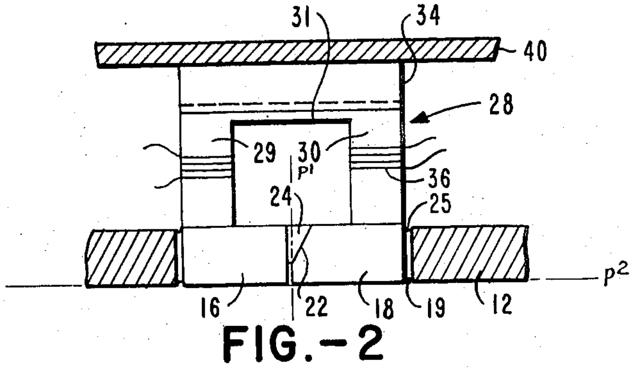
FIG. 2 is a side sectional view of the arrangement of FIG. 1.
Figure 3:
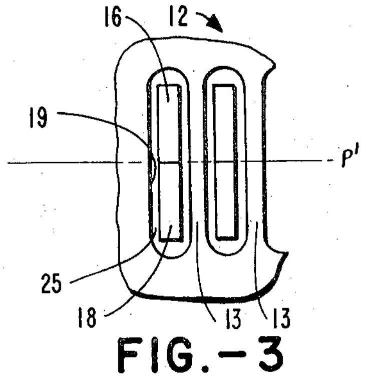
FIG. 3 is an enlarged fragmentary bottom view of a portion of the arrangement of FIGS. 1 and 2.
Figure 4:
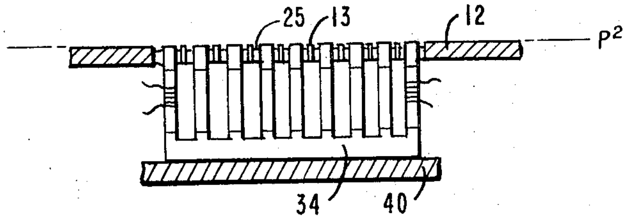
FIG. 4 is an end sectional view of the arrangement of FIGS. 1–3.

Referring now to FIGS. 1–4 of the drawings, a flying head assembly is shown for magnetic disk file and similar non-contact high density digital recording applications. The flying head assembly 10 comprises an air bearing element 12, typically a ceramic pad having a shaped aerodynamic surface for operation in facing relation to a movable record member 14 shown only in generalized form. The relative dimensions and spacing of the assembly 10 are not shown to scale, inasmuch as the extremely small spacing between the flying heads and the record member 14 cannot readily be depicted. In one typical example in accordance with the invention, however, a nine channel magnetic head assembly 15 was provided having a total width (transverse to the recording direction) of approximately 0.415 inch and a depth (normal to the recording direction) of less than 0.2 inch.

The magnetic and electrical structure for each of the channels is essentially the same, and only one such structure therefore need be discussed in detail. The pole tip structure comprises a pair of pole tip elements 16, 18, of magnetic material, preferably the type of relatively high hardness material sold and used for magnetic heads under the trademarks "Sendust", "Duraperm" or "Alfesil". The facing surfaces of the pole tip elements 16, 18 abut substantially adjacent to a common intersecting plane, $P^1$, defining the nominal gap position transversely across the tracks. The surfaces of the pole tip elements 16, 18 that face the record member 14 lie substantially flush with the aerodynamic surface of the air bearing pad 12 through separate slots 19 separated by webs 13 in the pad. The gap width between the pole tips 16, 18 is precisely defined by a thin, e.g. 150–180 microinch gap spacer of non-magnetic material, preferably such as "Havar" material. The gap depth, best viewed in FIG. 2 as the dimension from the exterior pole tip surface, is precisely defined as the juncture point at which one of the pole tip elements 18 has an inclined surface 22 extending away from the reference plane $P^1$. The gap in this region between the pole tip elements 16, 18 is filled by a conductive bonding material, preferably here of the type sold under the trademark "Silvaloy 45" or "Silvaloy 50". This element 24 bonds and seals the pole tip elements 16, 18 together.

The pole tips 16, 18 of each pair fit within the receiving slots 19 of the air bearing pad 12, and are joined thereto by a suitable adhesive 25, such as epoxy. The epoxy fill 25 is undercut at the webs 13 that define the slots 19, so that the air bearing surface remains smooth.

The rear faces of the pole tip elements 16, 18, lie in a reference plane $P^2$ spaced apart from and substantially parallel to the record member, and normal to the gap reference plane $P^1$. The adjoined U-shaped ferrite core structure 28 has a pair of core legs 29, 30 extending from a common base 31 for each magnetic head. In this example, the generally U-shaped core structure 28 for each head is of magnetic ferrite material, but the rear faces of the assembly of heads are joined to a common non-magnetic ferrite element 34. A winding 36 is wrapped around at least one of the core legs 30 of each head for providing energizing current during writing and for the generation of current during reading. The non-magnetic ferrite base 34 matches to the temperature coefficient of the individual ferrite core structures 28, while limiting magnetic cross talk between the heads. However, in many applications, the base 31 of the core structure 28 may comprise a single unitary member for all of the heads, without creating undue cross talk.

Figure 5:
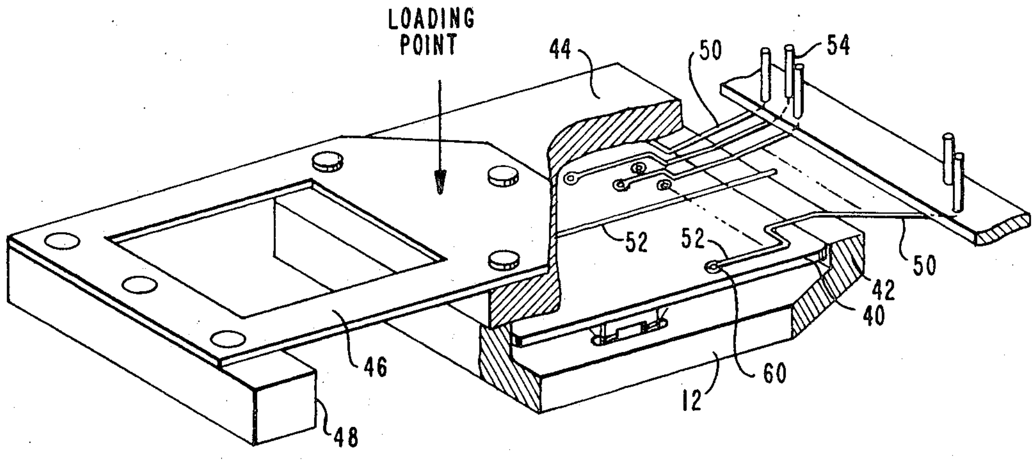
FIG. 5 is a perspective view, partially broken away, of the flying head assembly utilizing a head pad in accordance with the invention.
Figure 6:
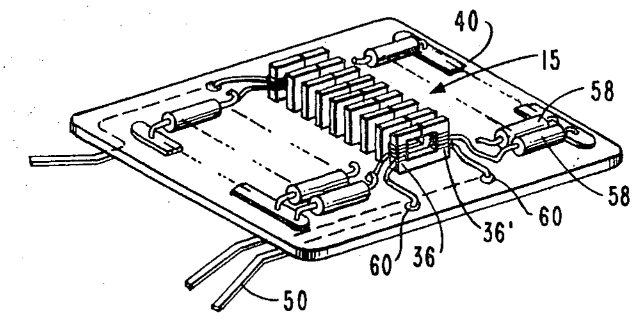
FIG. 6 is a perspective view of a fragment of the head assembly of FIG. 5.

The rear face of the non-magnetic ferrite element 34 is affixed to a small, generally rectangular printed circuit board 40, the opposite sides of which are shown in FIGS. 5 and 6 respectively. FIG. 5 also provides a perspective view of a portion of a flying head assembly utilizing head and circuit constructions in accordance with the invention. In this construction, the air bearing pad 12 and the circuit board 40 are mounted in a generally rectangular pad holder 42 having an aperture for receiving the air bearing pad 12 on the side of the recording surface and a cover 44 on the side opposite the air bearing surface. A resilient spring 46 coupled to the cover 44 at its free end and mounted on a fixed structure 48 normally urges the air bearing pad 12 in a direction away from the associated recording surface (not shown). An external force acting against the loading point on the structure with a predetermined force urges the air bearing pad into contact with the thin film of air on the associated record surface. Circuit innerconnections for head selection and data transfer are made from the individual heads through a plurality of thin, elongated fret conductors 50 coupled as by soldering or welding to individual circuit pads 52 on the back side of the printed circuit board 40. The fret conductors 50 are coupled to wire wrap or other pins for interconnection to external circuits. The fret conductors 50 are preferably of a resilient, conductive material, such as beryllium copper, and move with the head pad without introducing significant mechanical loading.

The circuit board 40 supporting the multi-channel magnetic head assembly 15 on the front side (i.e. the side facing the recording surface when in operation) provides support for the entire core structure, which is itself unitary. A pair of windings 36, 36' around each magnetic head are coupled in conventional fashion to selection diodes 58 and circuit terminals 60 on the circuit board 40. This circuit arrangement is illustrative of one conventional selection and data transfer arrangement, in which the selection diodes are selectively grounded. Assuming in this example the usage of a nine channel head, as previously referred to, nine selection diodes 58 are used for each of the reading and writing functions. Each of the diodes 58 has one end coupled to a different magnetic head assembly and the other end coupled to a ground conductor. Eleven external conductors are used, one for each of the magnetic head assemblies, one for data transfer and one for ground connection. No novelty is claimed in this particular circuit arrangement, but the description is given to illustrate the advantageous features which result from the ability to include this amount of circuitry directly in conjunction with the head assembly. As shown in FIG. 6, both the head assembly and the associated circuit elements are readily accessible at the same time, prior to joining of the core leg structure to the pole tip structure.

In the operation of the magnetic head assembly of FIGS. 1–4, only one of the heads is used for writing or reading at a particular time, as the head is maintained by the air bearing pad 12 at a very small distance (e.g. a few microns) from the record member 14 as the latter rotates at high speed. The individual pole tip pairs 16, 18 have virtually zero gap scatter, inasmuch as they all lie along the gap reference plane $P^1$. The unit is supported by the epoxy 25 joining the pole tip pairs to the webs 13 defining the apertures in which the pole tip pairs sit. The core structure is itself affixed to the pole tip pair structure at the reference plane $P^2$, and an extremely small but precise assembly results.

Compact and unitary structures in accordance with the invention have been provided in which the total weight of a unit such as shown in FIG. 5, including the flying head assembly, the spring 46 and the fret conductors 50, was less than 10 grams. In this, the weight of the magnetic head portion of the system itself was less than 0.5 grams. It will be appreciated that despite these dimensions and the variety of circuit functions that are incorporated within the system, no sacrifice is made of operative properties. To the contrary, the arrangement is particularly advantageous as a flying head assembly because of its structural stability. The unitary core structure provides a stable base for each of the pole tip pairs, so that any tendency toward dimensional change because the use of a hygroscopic adhesive is resisted by the base structure. Further this stability is enhanced by the common joining of the separate magnetic heads not only to the base structure but also to the air bearing pad and the rear circuit board.

Figure 7:
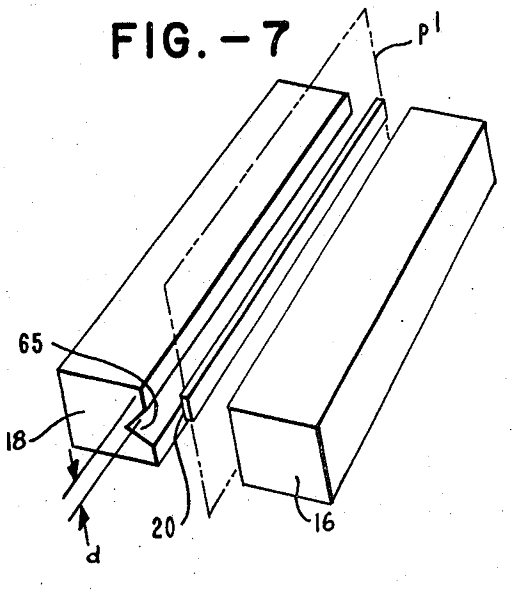
FIG. 7 is an exploded view of a pair of magnetic elements utilized in steps for preparing a pole tip structure in accordance with the invention.
Figure 8:
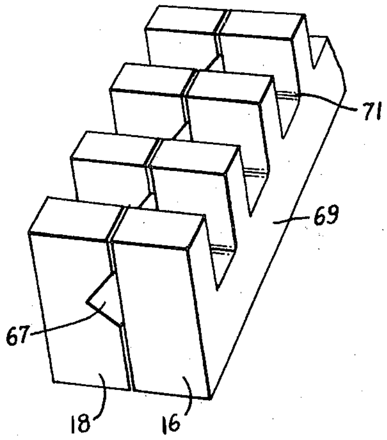
FIG. 8 is a perspective view of a partially fabricated pole tip structure in accordance with the invention at a subsequent stage in the manufacturing.
Figure 9:
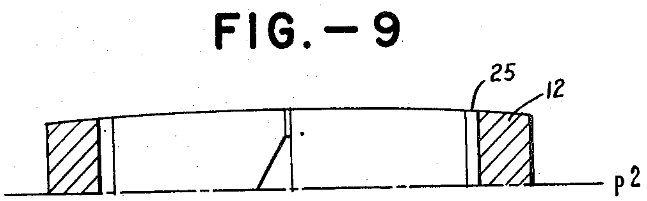
FIG. 9 is a perspective view of a yet later subsequent stage of the fabrication of the pole tip structure, showing individual pole tip elements joined to an air bearing structure.
Figure 10:
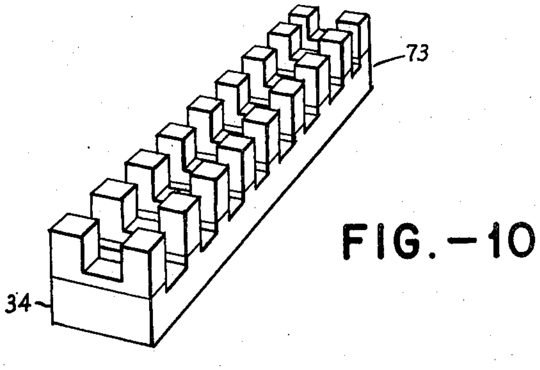
FIG. 10 is a perspective view of a unitary base structure that may be separately fabricated for joining to the pole tip structure of FIG. 7.

Methods in accordance with the invention may be better understood by reference to the successive views of FIGS. 7–9, as well as the separate view of FIG. 10. The same materials and relative dimensions are utilized for the pole tip elements 16, 18, the spacer 20 and other elements, as in the example above, and these accordingly need not be repeated.

In a first step in accordance with the invention, a bar of "Sendust" material may be cut into individual bar elements 16, 18, of generally rectangular section, and one long side of each may be machined, preferably by lapping, to a flat surface for parallelism to the gap reference plane $P^1$. The side of each bar element 16, 18 that is to face the record medium is also lapped flat, or to a curvature if desired. While one of the bars 16 is used in the form shown, the other bar 18 is subjected to subsequent steps, in which a longitudinal groove 65 having an edge at the desired spacing *d* or greater from the record medium side of the element 18 is cut parallel to the record medium side. The groove 65 is filled with a bonding material such as "Silvaloy" material 67. The corner that defines the depth d may be a greater spacing than the desired distance, so that the desired depth may be precisely defined after the unitary pole tip structure is formed.

A unitary pole tip structure utilizing the two pole tip bar elements 16, 18, is formed by interposing a Havar spacer 20, as shown in FIG. 7. This assembly, including the Silvaloy insert 42, is then bonded together under heat and pressure in a reducing atmosphere. The Silvaloy flows and bonds the halves of the structure together.

Thereafter, the resultant unitary pole tip bar 69, as shown in FIG. 8, is run through a thin grinding wheel, one having the thickness desired for the interchannel spacing. Grooves are cut normal to the non-magnetic gap at spaced points. In addition, the face opposed to the record medium side may be lapped until the desired gap depth dimension *d* is precisely achieved, as measured under a microscope. This then results in a comb-like structure, such as shown in FIG. 6, which thereafter is inserted into the slots 19 in the air bearing pad 12, as shown in FIG. 9. It will be noted in FIG. 8 that small fillets 71 are present in the corners of the grooves cut into the comb-like structure 69. These fillets 71 are useful in centering and precisely determining the alignment of the exposed surfaces of the pole tips relative to the air bearing pad 12 when placed together in FIG. 9. As also indicated in FIG. 9, the unifying base structure of the individual head assemblies is then cut off, preferably by grinding followed by lapping to the back reference plane $P^2$.

The core base structure 73 is prepared as is shown in FIG. 8 by cutting from a sngle bar of ferrite material with a grinding wheel to cut interchannel grooves, as well as a cross channel central groove that provides upstanding core legs. Preferably, the starting element is a laminate having a non-magnetic ferrite backing, with the grooves being cut down into the backing between channels. The core base structure is first affixed to the circuit board element 40. Because the upstanding core legs have free ends, prewound windings may simply be dropped on them manually, and the ends of the windings 36 may be affixed to the connector point 60 as previously discussed in conjunction with FIG. 6. It will be recognized that automatic circuit interconnection techniques as employed in integrated circuit and miniaturization technology may be employed at this point for automatic generation of the complete circuit board including the magnetic head assembly. The upper reference surface of the core base structure 73 is affixed by bonding, as with an epoxy, to the reference surface defined at the rear of the pole tip structure. This unit may then be dropped into the housing 42, and attached in the flying head assembly as shown in FIG. 5.

It is desirable that the desired air bearing crown on the pad 12 be precisely defined. This can be done before or after the addition of the pole tips. After the insertion of the pole tips, the undercut desired for the epoxy fill can be effected by lapping the crown surface onto the pad, or simply by the use of an abrasive powder on a softer conforming backing. This cuts away the relatively soft epoxy without affecting the finish of the ceramic pad or the pole tip points.

Although it will be appreciated that various alternatives and modifications of structures and methods in accordance with the invention have been discussed above, either modifications and variations are feasible within the scope of the appended claims.

What is claimed is:

1. An air bearing multi-channel magnetic head assembly comprising:

a unitary core structure including a base structure lying in a predetermined back plane, said core structure including a plurality of pairs of ferrite core legs spaced regularly apart along a gap defining plane lying substantially normal to said back plane, and terminating in flat surfaces lying in a common plane substantially normal to said legs;

individual coil means wound about at least one leg of each pair;

a plurality of gap-defining bar elements of magnetic material, each including a pair of coplanar flat surfaces, and each bridging a different pair of core legs, with the coplanar flat surfaces lying flush with the terminating surfaces of said core legs, and each including a non-magnetic spacer means in said gap plane; and an aerodynamic element having a curved surface indluding a plurality of longitudinal slots disposed at regular spaces corresponding to the core legs, a different bar element being mounted in and exposed through each slot.

2. The invention as set forth in claim 1 above, wherein said gap defining bar elements include a gap defining groove in one of said coplanar flat surfaces for each of said bar elements.

3. The invention as set forth in claim 1 above, wherein adhesive means couples each of said bar elements to the associated proximate surfaces of the slots in said aerodynamic element.

4. The invention as set forth in claim 1 above, wherein the bar elements have thicknesses such that they are generally continuous with the aerodynamic element.

5. The invention as set forth in claim 1 above, including in addition a circuit board element coupled to said base structure along said back plane and including circuit means coupled to the coil means.

6. The invention as set forth in claim 5 above, wherein said circuit board means comprises a plurality of selection diodes, and conductor means coupling said coil means and said selection diodes to an output terminal.

7. An air bearing multi-channel magnetic head assembly comprising:

a nonmagnetic ferrite backing slab having a reference surface lying in a first plane;

a plurality of generally U-shaped magnetic ferrite core members, each including a rectangular base and a pair of spaced apart rectangular legs extending perpendicularly therefrom, the bases of said core members being attached to said backing slab and said core members being spaced apart along a second plane normal to said first plane, said legs terminating in planar surfaces lying in a third plane parallel to said first plane;

a plurality of coil means, each coil means being disposed about a different leg of said core members, there being at least one coil means per pair of legs;

a plurality of substantially rectangular pole tip elements of relatively hard surfaced magnetic material having relatively low circuitry, each bridging a different pair of core legs, each of said pole tip elements including planar surfaces lying flush with the planar surfaces of said core legs and being attached thereto, said pole tip elements each including a non-magnetic Havar spacer gap lying substantially parallel to said second plane, and having at least one gap wall lying in a common plane;

an air bearing element including a plurality of slots, said air bearing element being substantially coplanar with said pole tip elements and each slot substantially encompassing a different pole tip element;

and epoxy means affixing each of said pole tip elements to the inner periphery of the associated slot.

* * * * *